(12) United States Patent
Yoshihara et al.

(10) Patent No.: US 6,791,998 B1
(45) Date of Patent: Sep. 14, 2004

(54) POLLING PERIOD CONTROLLING APPARATUS

(75) Inventors: Kiyohito Yoshihara, Tokyo (JP); Hiroki Horiuchi, Saitama (JP); Keizo Sugiyama, Tokyo (JP); Sadao Obana, Saitama (JP)

(73) Assignee: KDD Corporation, Tokyo (JP)

( * ) Notice: Subject to any disclaimer, the term of this patent is extended or adjusted under 35 U.S.C. 154(b) by 0 days.

(21) Appl. No.: 09/255,177

(22) Filed: Feb. 22, 1999

(30) Foreign Application Priority Data

Mar. 3, 1998 (JP) .......................................... 10-067860

(51) Int. Cl.$^7$ .......................................... H04L 12/403
(52) U.S. Cl. ...................... 370/449; 370/229; 370/252; 370/522
(58) Field of Search ................................ 370/229, 236, 370/252, 278, 401, 402, 449, 450, 451, 452, 462, 468, 477, 522

(56) References Cited

U.S. PATENT DOCUMENTS

| 5,311,505 A | * | 5/1994 | Antoine ........................ 370/56 |
| 5,402,478 A | | 3/1995 | Hluchyj et al. ............. 379/221 |
| 5,408,465 A | | 4/1995 | Gusella et al. ................. 370/17 |
| 5,446,730 A | | 8/1995 | Lee et al. ...................... 370/54 |
| 5,452,320 A | * | 9/1995 | Kim et al. ................... 375/224 |
| 5,457,689 A | * | 10/1995 | Marvit et al. |
| 5,461,611 A | | 10/1995 | Drake, Jr. et al. ............. 370/54 |
| 5,467,343 A | | 11/1995 | Lee et al. ...................... 370/54 |
| 5,566,351 A | * | 10/1996 | Crittenden et al. |

FOREIGN PATENT DOCUMENTS

| JP | 62-139440 | 6/1987 | ........... H04L/11/00 |
| JP | 03-208149 | 9/1991 | ........... G06F/13/00 |
| JP | 04-188925 | 7/1992 | ........... H04L/12/40 |
| JP | 04-249445 | 9/1992 | ........... H04L/12/42 |
| JP | 09-186688 | 7/1997 | ........... H04L/12/24 |
| JP | 02-58449 | 1/1998 | ........... H04L/12/44 |

OTHER PUBLICATIONS

P. Dini and R. Boutaba, "Deriving variable polling frequency policies for proactive management in networks and distributed systems", Proceeding of Fifth IFIP/IEEE Symposium on Integrated Network Management, IM '97, pp. 541–552, 1997.

P. Dini and G.V. Bochmann, "Agent based management of distributed systems with variable polling frequency policies", Proceeding on Fifth IFIP/IEEE Symposium on Integrated Network Management, IM '97, pp. 553–564, 1997.

(List continued on next page.)

*Primary Examiner*—Dang Ton
*Assistant Examiner*—Shick Hom
(74) *Attorney, Agent, or Firm*—Wesman, Chamlin & Kelly, P.A.

(57) ABSTRACT

A polling period controlling apparatus capable of polling with a period traceable temporal variations of management information values of a managed unit is provided with a polling period calculator 5 which decomposes a sequence of management information values, stored in the sequence memory 4, into the sum of sinusoids with different frequencies to find the maximum frequency and determines the polling period from an inverse of two times the largest frequency. A central controller 2 then compares between the required bandwidth specified by the polling period and a network management bandwidth and, when the former is smaller than the latter, obtains the management information value from the managed unit 11 using the polling period. When the former is greater, the central controller 2 obtains the management information value using the polling period determined from the network management bandwidth. The management information value obtained is saved in the sequence memory 4 while the oldest group of management data is eliminated.

10 Claims, 4 Drawing Sheets

OTHER PUBLICATIONS

A.B. Bondi, "A non-blocking mechanism for regulating the transmission of network management polls", Proceeding of Fifth IFIP/IEEE Symposium on Integrated Network Management, IM '97, pp. 565–580, 1997.

P. Moghe and M.H. Evangelista, RAP–rate adaptive polling for network management applications: Proceeding of IEEE Network Operation and Management Symposium, NOMS '98, pp. 395–399, 1998.

K. Ohta et al., "Effective polling control for network management using SNMP", Tehcnical Report of IEICE, IN94–135, CS94–163 (Nov. 1994), pp. 91–96.

J.M. Jaffe, "Algorithms for finding paths with multiple constraints", Networks, 14: 95–116, 1984.

S. Chang, "Fair integration of routing and flow control in communication networks", IEEE Trains, on Commun., 40 (4): 821–834, Apr. 1992.

L. Lin and J. R. Yee, "A real–time distributed routing and admission control algorithm for ATM networks", In Proc. of IEEE INFORCOM '93, pp. 792–801, 1993.

A. Kolarov and J. Hui, "Least cost routing in multiple–service networks", In Proc. of IEEE INFORCOM '94, pp. 1482–1489, 1994.

Z. Wang and J. Crowcroft, "Quality–of–service for routing for supporting multimedia applications", IEEE J. Select. Areas Commun., 14(7): 1228–1234, Sep. 1996.

W.C. Lee et al., "Routing subject to quality of service constraints in integrated communication networks", IEEE Network, pp. 46–55, Jul./Aug. 1995.

A. Iwata et al., "ATM routing algorithms with multiple QOS requirements for multimedia internetworking", IEICE Trains. Commun., E79–B(8): 999–10007, 1996.

C. Pornavalai et al. "QoS routing algorithm for multimedia communication", Technical Report of IEICE, IN97–30, CS97–11, MVE97–11 (Apr. 1997), pp. 15–22.

R. Hassin, "Approximation schemes for the restricted shortest path problem", Math. of Oper. Res., 17(1) : 36–42, 1992.

* cited by examiner

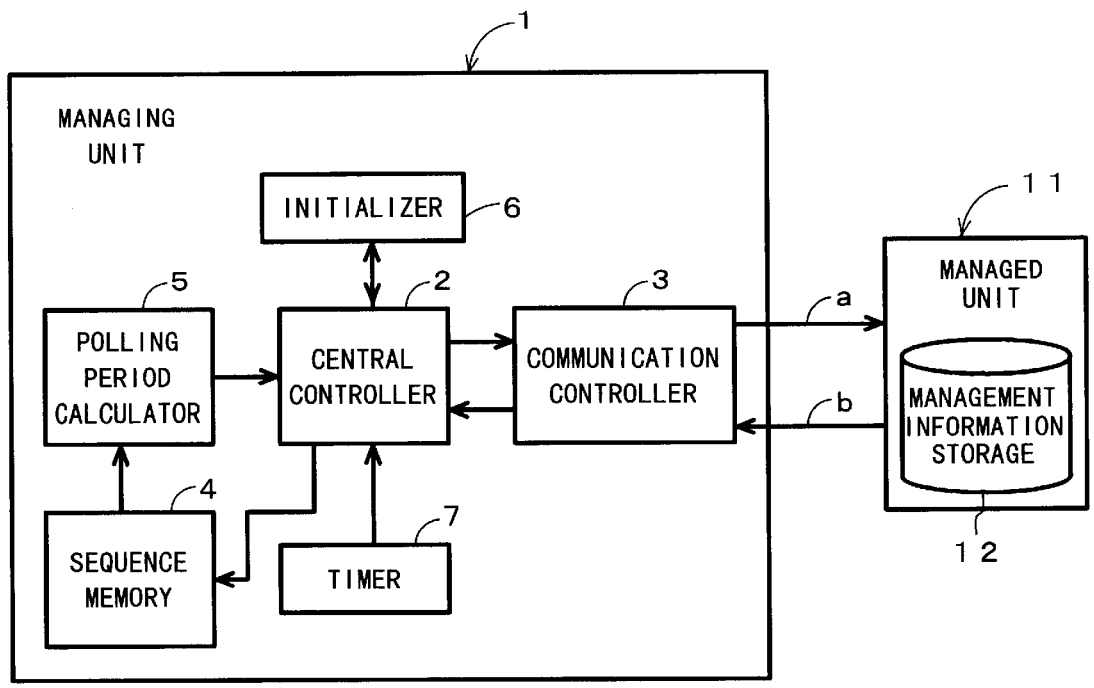

A SEQUENCE OF MANAGEMENT INFORMATION VALUES

POLLING PERIOD (T)

(GAUGE TYPE MANAGEMENT INFORMATION)

(COUNTER TYPE MANAGEMENT INFORMAITON)

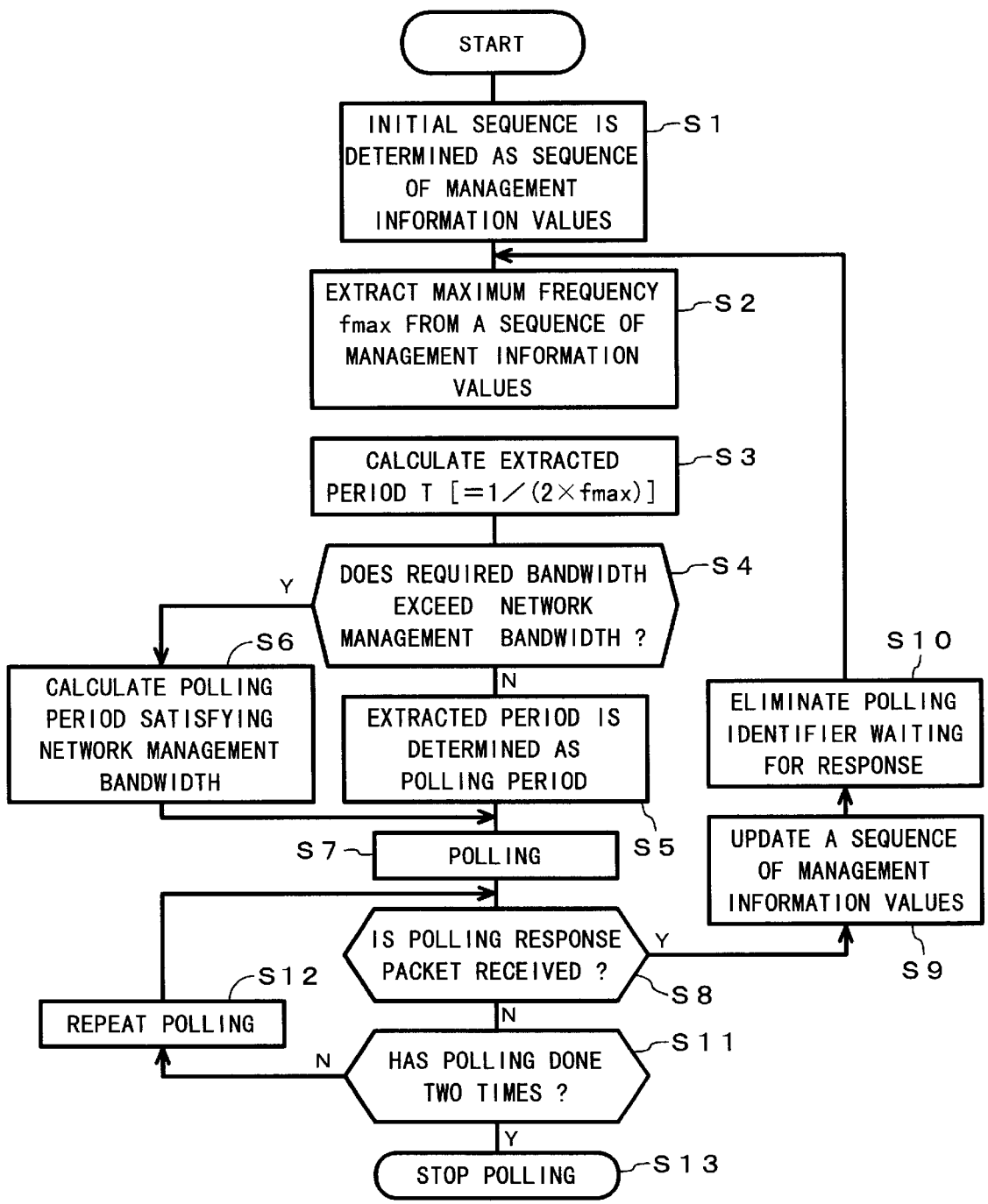

Fig. 7A

| PACKET SENDER ADDRESS | PACKET RECEIVER ADDRESS | MANAGEMENT INFORMATION IDENTIFIER | MANAGEMENT INFORMATION VALUE | MANAGEMENT INFORMATION IDENTIFIER | MANAGEMENT INFORMATION VALUE |
|---|---|---|---|---|---|
| MANAGING UNIT ADDRESS | MANAGED UNIT ADDRESS | 127 | (NOT SPECIFIED) | 128 | (NOT SPECIFIED) |

(POLLING PACKET)

Fig. 7B

| PACKET SENDER ADDRESS | PACKET RECEIVER ADDRESS | MANAGEMENT INFORMATION IDENTIFIER | MANAGEMENT INFORMATION VALUE | MANAGEMENT INFORMATION IDENTIFIER | MANAGEMENT INFORMATION VALUE |
|---|---|---|---|---|---|
| MANAGED UNIT ADDRESS | MANAGING UNIT ADDRESS | 127 | 32 | 128 | 3 |

(POLLING RESPONSE PACKET)

Fig. 8

PRIOR ART

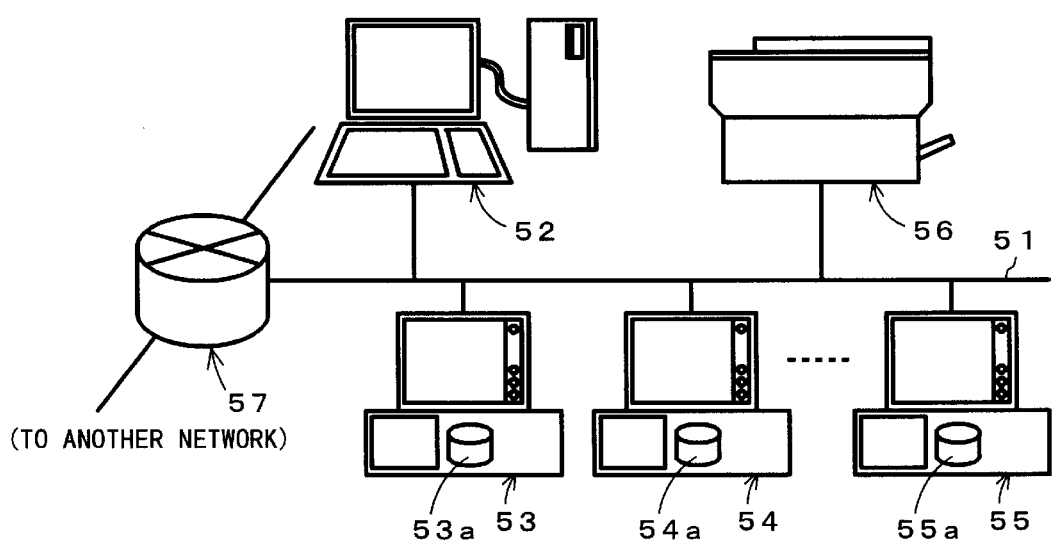

US 6,791,998 B1

POLLING PERIOD CONTROLLING APPARATUS

FIELD OF THE INVENTION

The present invention relates to a polling period controlling apparatus and particularly to a polling period controlling apparatus for use in network management.

DESCRIPTION OF THE RELATED ART

In an office, a factory, a university, or any other facility, a network is provided in which work stations, personal computers (referred to as PCs hereinafter), printers, routers, and other equipment are connected with each other, as shown in FIG. 8, and used for such as communication and data transfer. FIG. 8 illustrates a network where a work station 52, a group of first to nth PCs 53, 54, ..., 55, and a printer 56 are connected via a LAN 51 to each other. The LAN 51 may further be connected to another network via a router 57.

In such a network, network management is carried out for monitoring various forms of management information in real-time including the usage of central processing units (CPU) in the PCs 53 to 55 and the number of prints on the printer 56. It is assumed that the network management is conducted by the work station 52 which may thus be called a managing unit (thus being referred to as a managing unit 52 hereinafter). Accordingly, the PCs 53 to 55 and the printer 56 connected via the LAN 51 are called managed units.

For carrying out a network management, the managing unit 52 sends a polling packet to the managed units which in turn read out corresponding management information values from their storages 53a to 55a and send them in the form of polling response packets back to the managing unit 52.

It is necessary for the polling to dynamically determine its polling period for reading out the management information values from the managed unit and monitoring their temporal variation in real-time. A couple of methods for dynamically determining the polling period are known as described below. The first method is based on a round trip time from the sending a polling packet to the managed unit to the receiving a polling response packet by the managing unit. The second method is based on the number of the managed units being in operation, described later in detail.

More particularly, the first method involves a technique of shortening the polling period when the round trip time from the sending a polling packet to the managed unit to the receiving of a polling response packet by the managing unit is comparatively long, i.e. it is predicted that the polling and polling response packet traffic on the network becomes heavy, or lengthening the polling period when the round trip time is short, i.e. it is predicted that the traffic becomes not heavy. The second method is a technique of determining the polling period by assigning a bandwidth for polling in network management (thus being referred to as the network management bandwidth hereinafter) to all the managed units equally so that the traffic of the polling packets can be limited to less than the management bandwidth.

However, the first method determines the next polling period without concerning a temporal variation of the management information values of a managed unit and thus hardly enables to trace temporal variations of the management information values. It is now assumed that the managing unit 52 requires to receive a management information values from the printer 56 and determines the polling period from the time of receiving the polling response packet responsive to the polling packet. The polling period is determined regardless of temporal variations of the number of prints on the printer 56 and, when the number of prints is largely varied with time, has to be lengthened and fails to trace temporal variations of the management information values.

The second method permits the managing unit to poll all the managed units with the same polling period even if the management data in one managed unit is moderately varied with time while that of another managed unit is sharply varied with time, thus failing to trace temporal variations of the management information values.

SUMMARY OF THE INVENTION

It is an object of the present invention to provide a polling period controlling apparatus capable of polling with a period which can trace temporal variations of management information values in a managed unit and particularly, a polling period controlling apparatus capable of polling with a proper period which gives no excessive load to the network.

To accomplish the above object, the present invention is characterized in that a polling period controlling apparatus for use in network management comprises a first means for calculating a close-to-maximum frequency, including the maximum, from a sequence of management information values received from a managed unit and extracting a period from the calculated frequency, in which the period extracted (referred to as an extracted period hereinafter) is determined as the next polling period.

Secondly, the present invention is characterized in that the polling period controlling apparatus further comprises a second means for calculating a bandwidth required for polling with the extracted period (referred to as a required bandwidth hereinafter) and a third means for comparing the required bandwidth with a predetermined network management bandwidth for the network management, in which the extracted period is determined as the next polling period when the required bandwidth is smaller than the network management bandwidth.

Thirdly, the present invention is characterized in that the period from the network management bandwidth is determined as the next polling period when the required bandwidth is greater than the network management bandwidth.

According to the first feature, the period extracted according to the exactly or a close to maximum frequency of a sequence of the management information values obtained from a target managed unit is determined as the next polling period to be used, hence allowing the management information values to be obtained through tracing their temporal variations from the managed unit.

According to the second or third feature, the management information values can be obtained through tracing their temporal variations from a target managed unit. Also, it will be avoided that the traffic of polling packets and polling response packets for monitoring management information values may give a heavy load to the network.

BRIEF DESCRIPTION OF THE DRAWINGS

FIG. 1 is a block diagram showing a schematic arrangement of a managing unit and a managed unit according to the present invention;

FIGS. 2A and 2B are diagrams illustrating a format of a polling packets and a polling response packet, respectively;

FIG. 4 is a flowchart showing the operation of one embodiment of the present invention;

FIGS. 7A and 7B are diagrams illustrating another format of the polling packets and the polling response packet, respectively; and FIG. 8 is an explanatory view of a network involving the present invention.

DETAILED DESCRIPTION OF THE PREFERRED EMBODIMENTS

Figure 5:
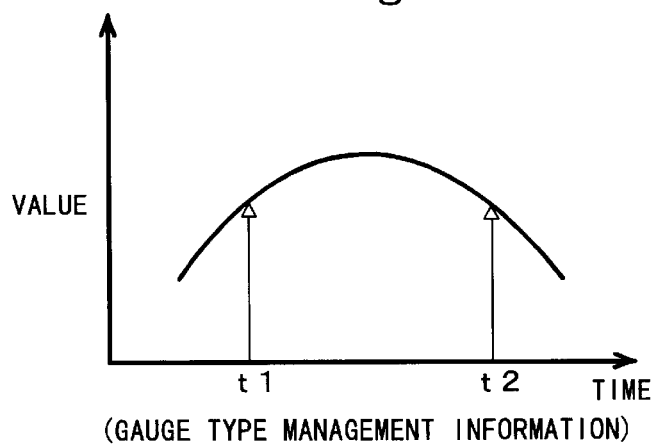
FIG. 5 is an explanatory diagram of a gauge type management information values.
Figure 6:
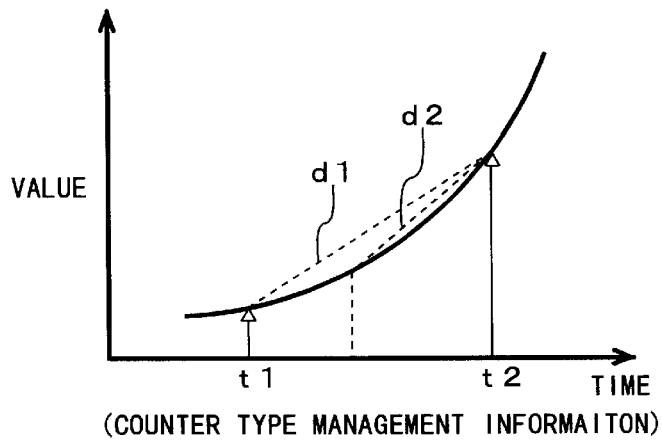
FIG. 6 is an explanatory diagram of a counter type management information values.

The present invention will be described in more detail referring to the accompanying drawings. For network management, it is essential to monitor the state of a network in real-time by tracing temporal variations of management information values including the utility rate of the central processing units (CPU) of PCs, the number of transmitted packets to other networks, and the number of received packets from other networks. The management information values of which the temporal variations should be traced by polling are classified into two types; a gauge type of positive integers where the value is increasing and decreasing as shown in FIG. 5 and a counter type of positive integers where the value is increasing only as shown in FIG. 6. Particularly, it is significant for the network management to monitor management information values of the gauge type obtained by a polling response packet and to monitor the difference values of the counter type obtained by consecutive polling response packets (i.e. a rate of change).

When the polling period (t2–t1) is too long as shown in FIGS. 5 and 6, it will be difficult to monitor temporal variation of management information values including the minimum and the maximum in the gauge type and the rate of change such as d2, which is set as a threshold for detecting an abnormal state of the network and is higher rate than d1 in the counter type [in this case, we may miss detecting the abnormal state if the polling period is (t2–t1)]. More specifically, it will be difficult to monitor the maximum when the polling period is relatively long as shown in the gauge type management information values in FIG. 5. Also, a rapid change in the management information values is hardly identified when the polling period is relatively long as shown in the counter type management information values in FIG. 6.

Conversely, when the polling period is too short, a temporal variations of management information values may easily be traced. As the result, the number of polling packets and of polling response packets for the network management is increasing and will impose heavy a load on the network, thus causing delay of the transmission or loss of the packets and impairing the quality of communications between users in the network. It is thus desired that the traffic of polling packets and polling response packets for the network management is limited to less than, for example, 5 percents of the minimum bandwidth in the network (the network management bandwidth).

FIG. 1 is a block diagram showing a schematic arrangement of a managing unit and a managed unit according to the present invention. As shown in FIG. 1, the managing unit 1 is substantially identical to the work station 52 shown in FIG. 8 and comprises a central controller 2, a communication controller 3, a sequence memory for sequences of management information values 4, a polling period calculator 5, an initializer 6, and a timer 7. The managed unit 11 includes a management information storage 12.

The communication controller 3 in the managing unit 1 sends a polling packet a, which has a format shown in FIG. 2A, to the managed unit 11 in the polling operation. Upon receiving the polling packet a, the managed unit 11 reads out a corresponding management information value specified in the polling packet from the management information storage 12 and sends it in the form of a polling response packet b which has a format shown in FIG. 2B to the managing unit 1.

The polling packet a consists mainly of a polling identifier, a packet sender address, a packet receiver address, a management information identifier, and a management information value which is for polling response and not specified as shown. The polling identifier of "250" indicates that the polling packet is responded with the polling response packet with the same number of the polling identifier. Similarly, the polling response packet b consists mainly of a packet sender address, a packet receiver address, a management information identifier, and a management information value. The value "32" of the management information indicates that the utility rate of CPU of the managed unit 11 is 32%, for example.

In the embodiment, the initial information necessary for the polling is stored in the initializer 6, which are at least a managed unit address, a management information identifier, an initial sequence of management information values, a polling packet length, and the value of the network management bandwidth. The initial sequence of management information values have been obtained in advance and are used for extracting an initial polling period. The polling packet length is a data length of the polling packet a. The network management bandwidth is assigned for polling in network management and it is generally desired to be less than a few or 5 percents of the minimum bandwidth of the network. The network management bandwidth is an intrinsic value and given in advance.

The sequence memory holds the fixed length sequences of management information values. Their initial sequences are given by the initializer 6 in the managing unit. When the managing unit receives a polling response packet, the sequence of management information values is updated by adding the newest value received to the end of the sequence and eliminating the oldest value from the sequence. This allows the sequences be kept fresh.

Figures 3A, 3B, 3C:
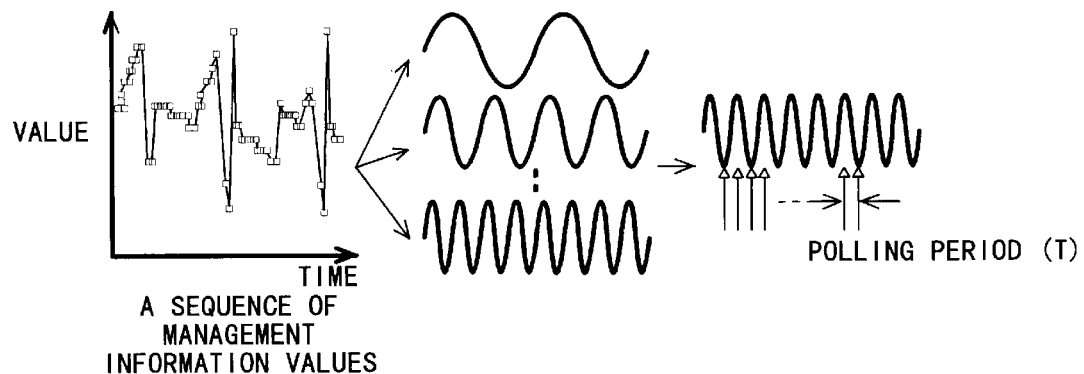
FIGS. 3A, 3B and 3C are explanatory views illustrating the operation of a polling period calculator shown in FIG. 1.

The operation of the polling period calculator 5 is explained. Assuming that a sequence of management information values which is stored in the sequence memory 4 is as illustrated in FIG. 3A, in the polling period calculator 5, the sequence is decomposed into the sum of sinusoids with different frequencies by making use of Discrete Fourier Transformation as shown in FIG. 3B. Then, the maximum frequency, fmax, is extracted from the sum of sinusoids with different frequencies to determine that the polling period T to be used next is $1/(2 \times fmax)$. It is desired but not limited to the maximum frequency fmax. Any frequency close to the maximum frequency may be used as fmax with equal success.

The operation of the embodiment shown in FIG. 1 is explained referring to FIG. 4. It is assumed that the initial information necessary for the polling is stored in the initializer 6, which are a managed unit address, the management information identifier, the initial sequence of management information values, the polling packet length, and the value of the network management bandwidth. The initial information necessary for the polling have been entered by an input device or by hand at the startup of the managing unit 1.

At Step S1, the initial sequence of management information values which has been received in advance is identified as the initial sequence. The initial sequence of management information values is then transferred from the initializer 6 to the sequence memory 4. At Step S2, the polling period calculator 5 applies Discrete Fourier Transformation to the sequence of management information values from the sequence memory 4 to find the maximum frequency fmax. At Step S3, the reciprocal of the maximum frequency fmax is calculated to have an extracted period T [=1/(2×fmax)].

It is then examined at Step S4 whether or not an extracted bandwidth determined from the polling packet length and the extracted period T exceeds the network management bandwidth. This is explained using an example. Assuming that the polling packet length is 90 bytes and the extracted period T calculated from the sequence of management information values is 16 seconds, the extracted bandwidth is 45 (bps) as calculated from:

(90×8) bits÷16 seconds=45 bps

When the network management bandwidth determined intrinsic to the network is 10 kbps, established is the extracted bandwidth < the network management bandwidth. Then, the procedure goes to Step S5 where the extracted period T or the polling period is determined 16 seconds.

When the network management bandwidth is 30 bps, it is judged that the extracted bandwidth of 45 bps is greater than the network management bandwidth and the procedure moves to Step S6. Then, the polling period which meets the network management bandwidth is calculated from:

(90×8) bits÷30 bps=24 seconds

As set forth above, Step S5 or S6 where the polling period is determined is followed by Step S7 for polling with the determined polling period. Then, it is examined at Step S8 whether the polling response packet is received or not. When yes, the procedure advances to Step S9 where the management information value carried in the polling response packet is added to a sequence of management information values. It may be favorable to eliminate the oldest value in the sequence of the management information values at the same time. Step S10 follows where the polling identifier in standby for the response is erased. The procedure then returns back to Step S2 and the operation described above is repeated.

When it is judged negative at Step S8 because, for example, the polling response packet is not received in a round trip time of 16 seconds, the procedure goes to Step S11 where it is examined whether or not the polling has been done two times. When not, the procedure moves to Step S12 to repeat the polling. Then, Step S8 follows where it is examined whether the polling response packet is received or not. When yes, the procedure goes to Step S9 and the operation described follows. When the polling response packet is not received again in the round trip time of 16 seconds, the procedure goes to Step S11 where it is examined whether or not the polling has been done two times. When yes, it is judged that there may be a fault in the managed unit or the network and the procedure goes to Step S13 for canceling the polling operation.

As set forth above, the embodiment allows the extracted period T to be calculated depending on temporal variations of management information values of the managed unit. For example, when the temporal variation of the management data is high (or low), the extracted period T becomes short (or long). Accordingly, the traffic of polling packets and polling response packets can successfully be limited to less than the network management bandwidth while the temporal variation of the management information values is being traced.

A second embodiment of the present invention will now be described referring to FIG. 7. This embodiment permits one or more sequences of management information values to be obtained from a single managed unit, like as shown in FIG. 7. The polling packet and the polling response packet are thus modified as shown in FIG. 7. More specifically, illustrated are an SNMP (Simple Network Management Protocol) type of the polling packet and the polling response packet.

In this type of the polling packet and the polling response packet, the length of the polling packet is varied. Assuming that the number of the sequences of management information values to be polled is n, the length L of the polling packet of the SNMP type is calculated from:

$L = 18.6 \times n + 70.5$ bytes

In this embodiment, L is used as the polling packet length to calculate the extracted bandwidth at Step S4 in FIG. 4. Also, the polling period calculator 5 (See FIG. 1) extracts the maximum frequencies from groups of the managed data for every management data, selects the largest of the maximum frequencies, and determines the extracted period T for a target managed unit by using it.

As set forth above, the embodiment allows multiple sequences of management information values to be obtained in one single polling operation and can thus trace temporal variations of management information values for each managed unit.

As apparent from the foregoing description, the present invention designates as the next polling period the extracted period determined according to the maximum or a close to maximum frequency in the sequences of management information values from the managed unit and can thus trace temporal variations of the management information values of the managed unit. Accordingly in obtaining the gauge type management information, any particular item such as the maximum or the minimum essential for the network management can be identified without missing. Also in obtaining the counter type management information, a rate of change which is significant for the network management can be measured at a higher accuracy than that of any conventional manner.

Moreover, the present invention prevents the polling operation for obtaining the management information value from imposing a heavy load on the network and ensures the proper response to temporal variations of management information values of the managed unit without impairing the quality of communications between users in the network.

What is claimed is:

1. A polling period controlling apparatus for use in network management comprising:

a first means for calculating a close-to-maximum frequency, including a maximum, from a sequence of management information values received from a managed unit and extracting a period from the calculated frequency, in which the period extracted referred to as an extracted period hereinafter is determined as a next polling period;

a second means for calculating a bandwidth required for polling with the extracted period referred to as a required bandwidth hereinafter; and a third means for comparing the required bandwidth with a predetermined bandwidth for the network management, in which the extracted period is determined as the next polling period when the required bandwidth is smaller than a network management bandwidth.

2. The polling period controlling apparatus according to claim 1, wherein the period form the network management bandwidth is determined as the next polling period when the required bandwidth is greater than the network management bandwidth.

3. The polling period controlling apparatus according to claim 2, wherein the calculation of a close-to-maximum frequency, including the maximum, from a sequence of management information values received from the managed unit is carried out by Discrete Fourier Transformation.

4. The polling period controlling apparatus according to claim 2, wherein the sequence of management information values is updated by addition of a set of newly received management data thereto.

5. The polling period controlling apparatus according to claim 2, wherein the first means calculates the maximum frequencies from sequences of the management information values received from the managed unit and extracts the period from the close-to-maximum frequency, including the maximum, among the maximum frequencies.

6. The polling period controlling apparatus according to claim 1, wherein the calculation of the close-to-maximum frequency is carried out by Fourier expansion.

7. The polling period controlling apparatus according to claim 1, wherein the sequence of management information values is updated by addition of a set of newly received management data thereto.

8. The polling period controlling apparatus according to claim 1, wherein the first means calculates the maximum frequencies from sequences of the management information values received from the managed unit and extracts the period from the close-to-maximum frequency, including the maximum, among the maximum frequencies.

9. The polling period controlling apparatus according to claim 1, wherein the sequence of management information values is updated by addition of a set of newly received management data thereto.

10. A polling period controlling apparatus for use in network management comprising:
a first means for calculating, using a Discrete Fourier Transformation, a close-to-maximum frequency including a maximum, from a sequence of management information values received from a managed unit and extracting a period from the calculated frequency, in which the period extracted is determined as a next polling period.

* * * * *